Aug. 12, 1947.     J. S. CONNER     2,425,306
RETRACTILE WING AND LANDING GEAR
Filed April 26, 1945     2 Sheets-Sheet 1
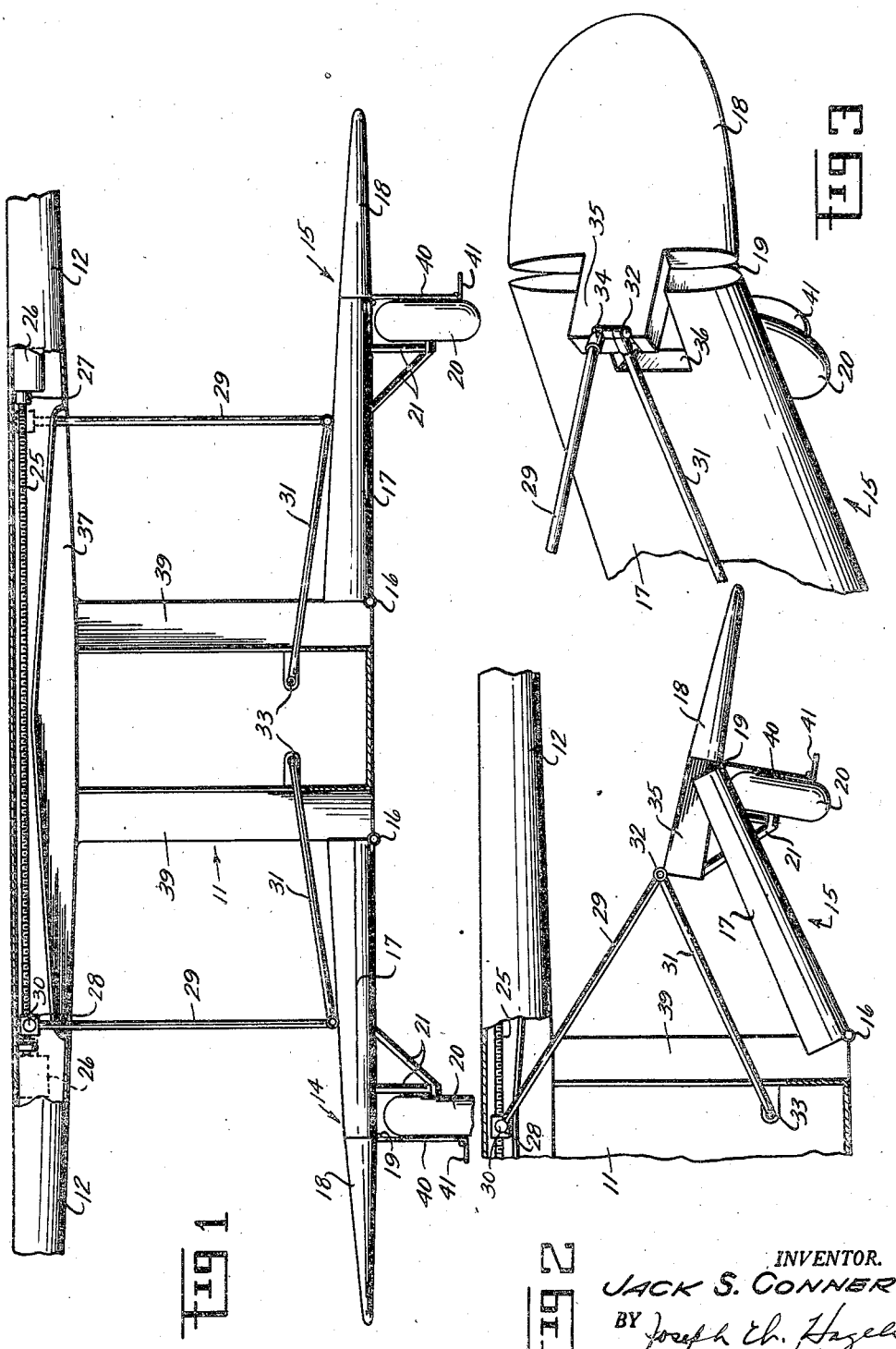
INVENTOR.
JACK S. CONNER
BY
ATTORNEYS Aug. 12, 1947.　　J. S. CONNER　　2,425,306
RETRACTILE WING AND LANDING GEAR
Filed April 26, 1945　　2 Sheets-Sheet 2
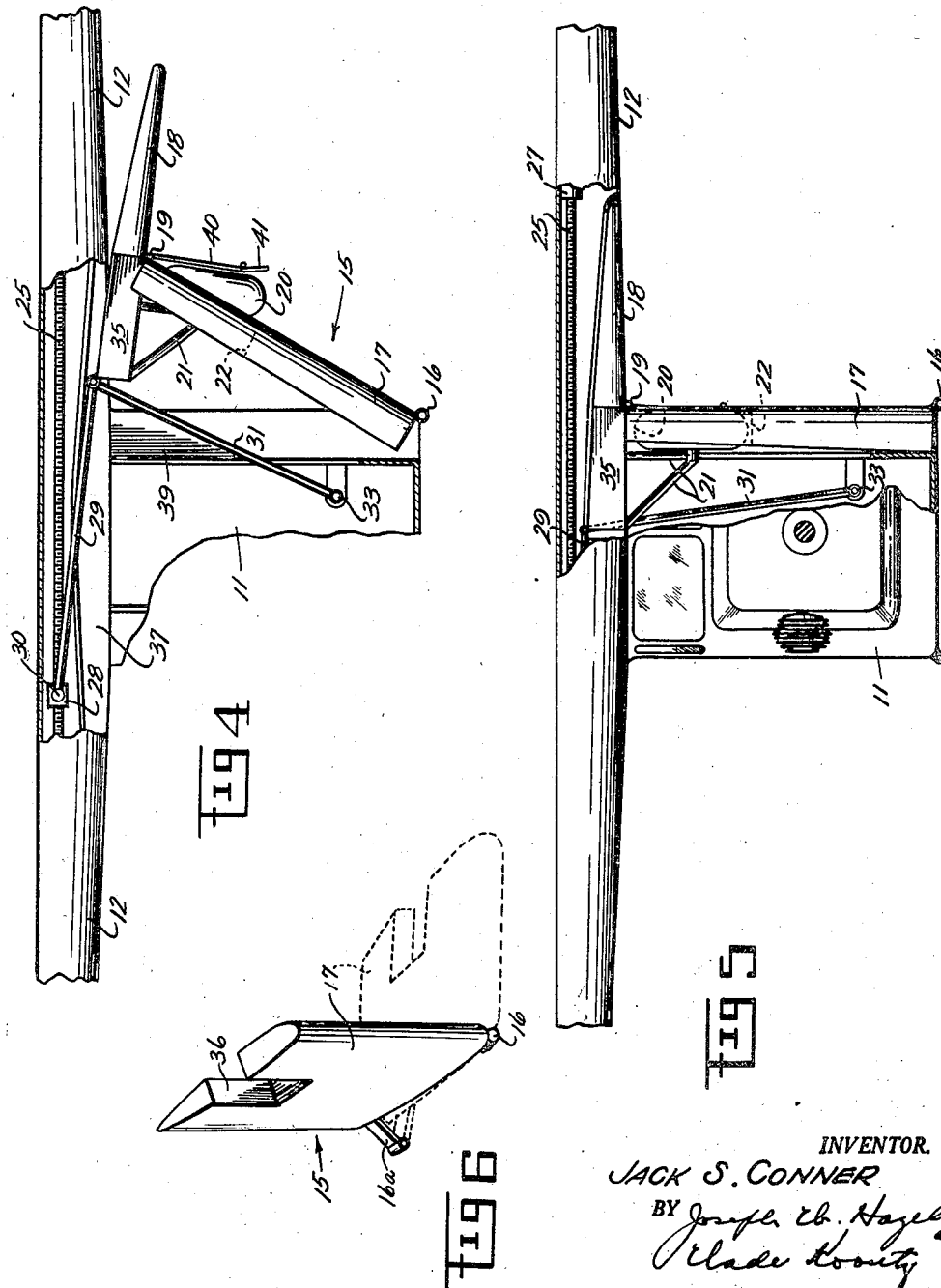
INVENTOR.
JACK S. CONNER
BY
ATTORNEYS Patented Aug. 12, 1947

2,425,306

UNITED STATES PATENT OFFICE 2,425,306

RETRACTILE WING AND LANDING GEAR

Jack S. Conner, Los Angeles, Calif.

Application April 26, 1945, Serial No. 590,446

12 Claims. (Cl. 244—102)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in airplanes, especially high wing monoplanes, and among other objects, aims to provide a pair of retractile auxiliary wings carrying landing gear, together with power-actuated mechanism to operate the same, whereby the pilot of an airplane may lower the auxiliary wings prior to landing to reduce the landing speed, and may fold the auxiliary wings after taking off to reduce the drag. Use of the invention will make it possible for airplanes to land on and take off from air fields which are smaller than would normally be considered safe.

Various suggestions have been made to lower the landing speed of airplanes and to facilitate take-offs by employing auxiliary airfoils which are foldable, once the airplane is in flight, to reduce drag. For instance, it has been proposed in the Medvedeff Patent No. 1,958,486, dated May 15, 1934, to suspend auxiliary airplane wings below the main wings and foldable against the opposite sides of the airplane fuselage after being turned into vertical positions. The Salisbury et al. Patent No. 1,792,764, dated February 17, 1931, discloses auxiliary airplane wings which are below the main wings and are folded down on opposite sides of the fuselage, very much like the wings of a bird. The Ivan Anderson Patent No. 1,793,349, dated February 17, 1931, shows auxiliary wings, either above or below the main wings, which are foldable by swinging backwardly about vertical pivots. A. A. Reid in Patent No. 2,122,214, dated June 28, 1938, suggests the use of auxiliary planes which when extended depend from the wings in a V or dihedral and serve also as landing wheel struts, and are foldable against the undersides of the wings to bring the landing wheels up into wheel wells located within the wings. However, my invention is believed to have important advantages over each of these prior suggestions.

In the accompanying drawings forming a part of this specification.

Fig. 1 is an essentially diagrammatic sectional elevation of an airplane employing the invention, parts being broken away or omitted;

Fig. 2 is a fragmentary sectional elevation showing one auxiliary wing partly folded;

Fig. 3 is a perspective view of an auxiliary wing partly folded, approximately to the extent shown in Fig. 2;

Fig. 4 is a fragmentary sectional elevation showing an auxiliary wing nearly completely folded;

Fig. 5 is a fragmentary sectional elevation showing the auxiliary wings completely folded; and Fig. 6 is a perspective view showing the hinge arrangement for the inboard panel of the auxiliary wing.

Referring particularly to the drawings, the airplane partly shown therein has a fuselage 11 and upper wings 12 with a wing spar (not shown) extending spanwise. A retractile lower auxiliary wing 14, 15 is hinged to the fuselage on either side thereof by means of hinges 16, 16a, which form what is known as a delta hinge, see Fig. 6. Wings 14, 15 are identical except that they are reversed or are mirror images of each other. Each auxiliary wing consists of an inboard wing or panel 17 and an outboard wing or panel 18 hinged to the inboard panel as indicated at 19. The inboard panel 17 is adapted to be moved from a substantially horizontal position (Fig. 1) to a substantially vertical position where it is juxtaposed to the fuselage (Fig. 5). Simultaneously the outboard panel 18 moves from a horizontal position aligned with inboard panel 17 to a horizontal position beneath wing 12. The delta hinges 16, 16a give the auxiliary wings a zero or negative angle of attack during the folding operation so as to minimize the power required at this time. A landing wheel 20 is immovably secured by struts 21 to the inboard panel 17 to extend below the same substantially at right angles when the auxiliary wing is fully extended. When the auxiliary wing is folded, its landing wheel will be received in a wheel well 22 provided in the inboard panel.

To operate the retractile wings, two parallel lead screws 25 (only one of which is shown) are journalled in bearings fixed to the wing spar or some other part of the wing and are arranged spanwise or parallel to the longitudinal axis of the wings. A reversible electric motor 26 is coupled through a reduction gearing 27 to each lead screw. A master switch, safety or limit switches, and the necessary wiring connecting with a battery or generator will also be provided for each wing folding mechanism, but are not shown. Obviously a fluid motor or other prime mover may drive each lead screw. Each lead screw drives a traveling nut 28 to which one end of a retracting strut 29 is secured, for instance by means of a ball or universal connection 30. If desired each nut 28 may be guided by a T-slot in a guide (not shown) parallel to the lead screw and rigidly secured to the wing to prevent any bending of the elongated lead screw under the reaction from the stresses imposed thereon. A link 31 is pivotally connected to the outboard panel as at 32, and is pivoted as at 33 to the fuselage, while retracting strut 29 is pivoted as at 34 to the outboard panel. The result is that the thrust longitudinally of the retracting strut from the traveling nut is translated into swinging of link 31 from the upright position of Fig. 5 to the (nearly) horizontal position of Fig. 1. At the same time the outboard panel is brought from the upper position of Fig. 5 to the lower position, Fig. 1, and the inboard panel is swung from the upright to the horizontal position. As the landing wheel is fixed at right angles to the general plane of the outboard panel, it will be lowered into operative position with the outboard panel and will be locked in that position, because the outboard panel is secured by the vertical retracting strut 29 and nut 28, which is then held stationary and immovable. The auxiliary wings are locked in both folded and unfolded positions.

As a study of the drawings will reveal, the primary function of the retracting struts 29 is to effect the actual folding and unfolding of the auxiliary wings, and locking of the outboard panels 18 relative to the inboard panels at both limits of movement. The outboard panels each have tongues 35 integral therewith and extending inwardly of hinges 19, being received in recesses 36 provided in the outer ends of inboard panels 17 when the auxiliary wing is fully extended. The tongues 35 provide levers by which the retracting struts may swing the outboard panels relative to the inboard panels, which is essential in the preferred arrangement wherein the outboard panels are substantially at right angles to the inboard panels when the auxiliary wings are folded, but are aligned with the inboard panels when the auxiliary wings are unfolded. The primary function of links 31 is to insure the proper angular disposition of the outboard panels as they enter and move out of wing recess 37 provided on the underside of main wing 12. Each link 31 with tongue 35, inboard panel 17 and the pivots or hinges between them, together with that part of the fuselage which lies between pivot 33 and hinge 16, make up a linkage which is almost a parallel motion linkage, and the outboard panel is nearly horizontal, whatever its position, although it is sufficiently inclined out of the horizontal, as shown in Fig. 4, to insure that it will freely enter wing recess 37 and move out of the same. Since the outboard panels are moved simultaneously, the airplane remains under control of the pilot while the auxiliary wings are folded and unfolded.

Links 31 pass through slots 38 which extend vertically through the walls of the fuselage, which will therefore be strengthened at the top and bottom (by beams, etc., not shown) to prevent any tendency toward failure along the transverse planes of the two slots 38. As the lead screws 25 are parallel and preferably in the same horizontal plane, the retracting struts 29 and links 31 are spaced apart longitudinally of the fuselage as well as laterally. Recesses 39 in the sides of the fuselage receive the inboard panels 17 to minimize drag when the auxiliary wings are folded. Covers 40 may be fixed to each landing wheel 20 on the outboard side thereof and may have hinged extensions 41 which are projected outwardly at right angles when the landing wheels are down to obviate contact with the runway, but are pulled down flat (by a well known mechanism now in use on military airplanes) when the landing wheels move into wheel wells 22, in Figs. 4 and 5. Thus the wheel wells are closed during normal flight and drag is further reduced.

What is claimed is:

1. An aircraft comprising, in combination, a fuselage having a pair of main wings attached thereto, each wing having a recess on the underside thereof; a pair of auxiliary wings each consisting of an inboard panel hinged to the fuselage and an outboard panel hinged to the outer end of the inboard panel; power-actuated means to swing the auxiliary wings inwardly so that the inboard panel moves from a substantially horizontal position to a substantially vertical position alongside the fuselage; and means maintaining the outboard panel generally horizontal as the auxiliary wing is moved between its extreme positions, the outboard panel being received within said wing recess when the auxiliary wing is swung inwardly and being aligned with the inboard panel when the auxiliary wing is fully extended.

2. The invention according to claim 1, wherein there is a landing wheel fixed to each outboard panel on the underside and each inboard panel has a recess receiving the landing wheel when the outboard panel is received in the wing recess; the fuselage having a recess on each side receiving an inboard panel when the latter is swung into vertical position.

3. The invention according to claim 1, wherein the power-actuated means consists of two independently operated mechanisms each comprising a motor, a lead screw and gearing interposed between the motor and the lead screw, said motors, lead screws, and gearing being carried within the main wing, a nut traveling on each lead screw, and a retracting strut secured at one end to each nut and pivotally connected at the other end to the outboard panel, thereby to convert the travel of each nut into swinging of the auxiliary wing.

4. In combination with a monoplane having a fuselage and wings, means for converting the monoplane into a biplane during flight, comprising a pair of auxiliary wings each consisting of an inboard panel and an outboard panel, the inboard and outboard panels being hinged together, means hinging the inner end of each inboard panel to the fuselage near the bottom thereof and permitting the inboard panel to fold up against the side of the fuselage, and means causing each outboard panel to fold against the underside of the monoplane wing when the inboard panel is folded as described; and operator-controlled power means to effect folding and unfolding of the auxiliary wings.

5. The invention according to claim 4, wherein the folding and unfolding of each auxiliary wing is effected by means of a power-actuated retracting strut, which is pivotally connected to the outboard panel and is substantially vertical when the auxiliary wing is unfolded and is nearly horizontal and nearly parallel to the longitudinal axis of the main wing when the auxiliary wing is folded; and a link is connected at its outer end to each outboard panel and is pivoted at its inner end to the fuselage, each link forcing the corresponding outboard panel to assume a substantially horizontal position adjacent the monoplane wing when the inboard panel is folded against the side of the fuselage.

6. The invention according to claim 4, wherein a pair of parallel, power-actuated, reversible lead screws are journalled in the main wing and a nut is moved by each lead screw, a retracting strut is connected at one end ot each nut and at its other end is pivoted to the outboard panel, and a link is pivotally connected at its outer end to the inner end of each outboard panel and is pivoted at its inner end to the fuselage; each outboard panel being aligned with the inboard panel when the auxiliary wing is unfolded, and each retracting strut being substantially vertical while the link is nearly horizontal; each outboard panel being at right angles to and above the corresponding inboard panel when the auxiliary wing is folded, and the corresponding retracting strut then being nearly horizontal while the corresponding link is nearly vertical.

7. The invention according to claim 4, wherein each outboard panel has a tongue extending inwardly from the hinge axis between the two panels, and each inboard panel has a recess receiving said tongue; and a pair of links are pivoted at their inner ends to the fuselage so as to swing in a plane transverse to the longitudinal axis of the fuselage, said links each having a pivotal connection at its outer end to said tongue; the parts being so constructed and arranged that the outboard panel is aligned with the inboard panel to form one continuous wing when the auxiliary wing is unfolded, and the outboard panel is held flat against the underside of the main wing of the monoplane when the auxiliary wing is folded.

8. The invention according to claim 4, wherein each outboard panel is hinged to the inboard panel at the outer end of the inboard panel, each outboard panel having a part extending inwardly of its hinge axis and providing a lever arm; said power means consisting of a retracting strut hinged at one end to the inner end of each of said inwardly extending parts, a nut connected to the other end of each retracting strut, a power driven lead screw supported on the monoplane wings, said nut being movable back and forth on the lead screw, which is parallel to the longitudinal axis of the wings, and a link pivotally connected at its outer end to the inner end of each of said inwardly extending parts and pivotally connected at its inner end to the fuselage near the bottom thereof.

9. In combination with a high wing monoplane having a fuselage and wings, a pair of foldable auxiliary wings each comprising an inner section hinged to the fuselage on either side thereof beneath the wings of the monoplane and an outer section hinged to the outer ends of the inner section; operator-controlled power means to fold and unfold the sections of said auxiliary wings during flight; said auxiliary wings when unfolded converting the monoplane into a biplane; the fuselage and wings of the monoplane both having recesses to respectively receive the inner and outer sections of the auxiliary wings when folded, thereby to reduce drag.

10. In an aircraft, a fuselage and a pair of wings extending laterally from the top thereof, a second pair of wings extending laterally from the bottom thereof, said second pair each being composed of an outer and an inner section, the inner section being hinged to the fuselage, and the outer section being hinged to the inner section, vertically extending pockets in the side of the fuselage, and horizontally extending pockets in the bottom of the upper wings, and linkage for folding said second pair of wings, the inner sections into the said vertical pockets and the outer sections into the said horizontal pockets.

11. The aircraft defined in claim 10 with a landing wheel supported on each outer section near the hinge point, and a pocket in the inner section for receiving the wheel when the sections are folded into their respective pockets.

12. The aircraft defined in claim 10 wherein the axis of the hinge which joins the inner section to the fuselage is so deformed with respect to the axis of the fuselage as to bring the wing sections to a negative angle of attack when folding is taking place.

JACK S. CONNER.

REFERENCES CITED

The following references are of record in the file of this patent:

UNITED STATES PATENTS

| Number | Name | Date |
|---|---|---|
| 1,958,486 | Medvedeff | May 15, 1934 |

FOREIGN PATENTS

| Number | Country | Date |
|---|---|---|
| 772,353 | France | Apr. 13, 1934 |